Figure 1:
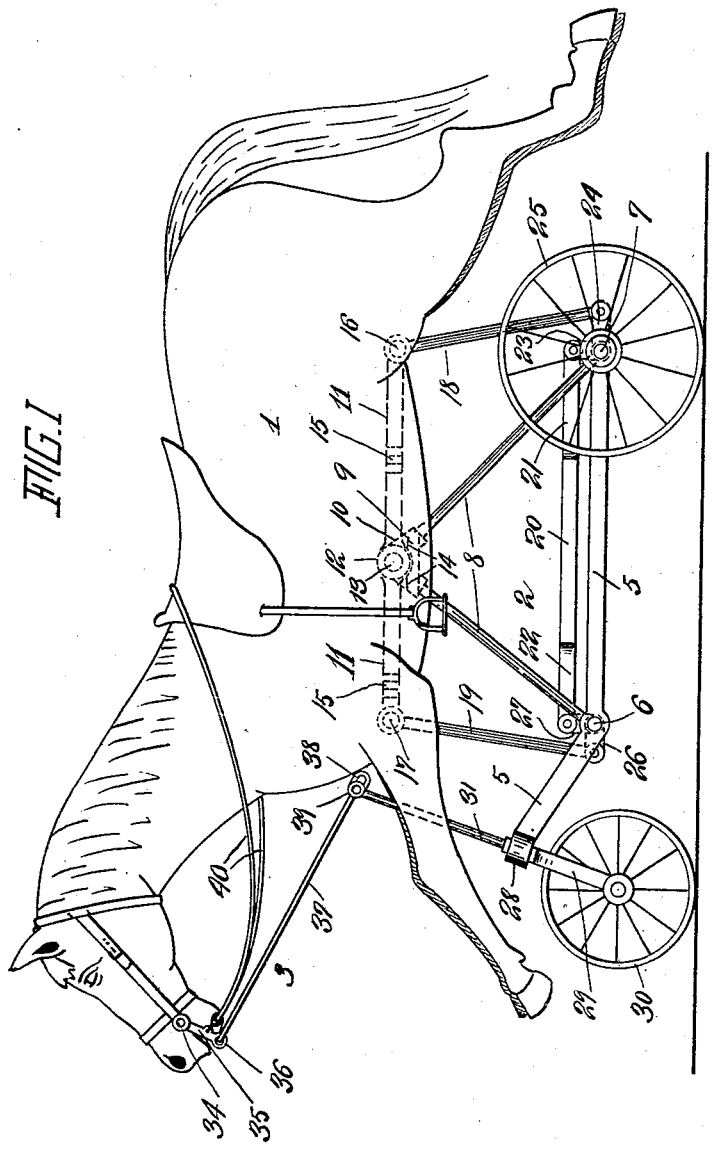

No. 873,885.

PATENTED DEC. 17, 1907.

O. A. MORSE.
VELOCIPEDE.
APPLICATION FILED MAR. 15, 1906.

2 SHEETS—SHEET 1.

Witnesses
John M. Nolan
Emily Baxter

Orson A. Morse, Inventor
By his Attorney Walter H. Dodd

No. 873,885. PATENTED DEC. 17, 1907.
O. A. MORSE.
VELOCIPEDE.
APPLICATION FILED MAR. 15, 1906.
2 SHEETS—SHEET 2.
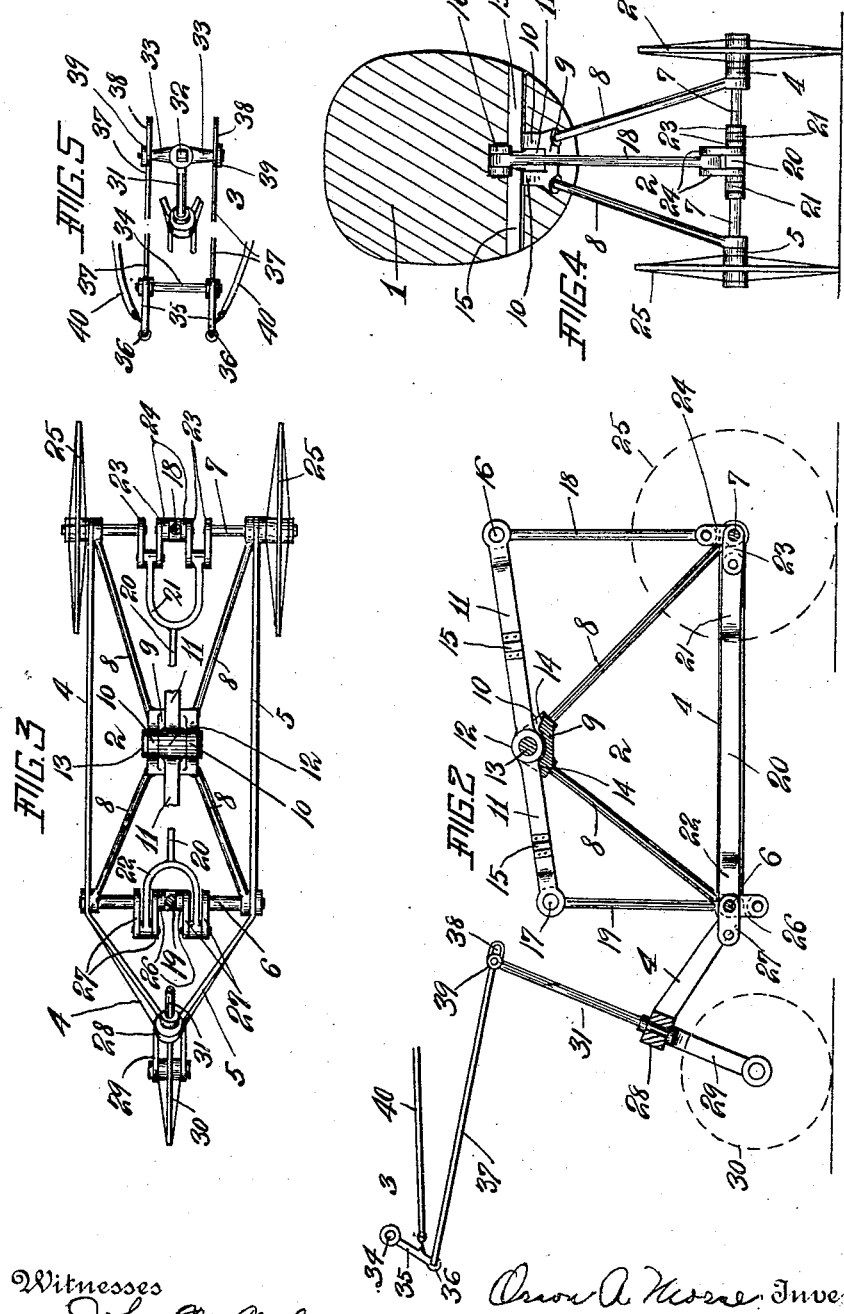

UNITED STATES PATENT OFFICE.

ORSON A. MORSE, OF ARLINGTON, NEW JERSEY, ASSIGNOR TO NELSON H. PEPPLER, OF ARLINGTON, NEW JERSEY.

VELOCIPEDE.

No. 873,885.  Specification of Letters Patent.  Patented Dec. 17, 1907.

Application filed March 15, 1906. Serial No. 306,219.

*To all whom it may concern:*

Be it known that I, ORSON A. MORSE, a citizen of the United States, residing at Arlington, in the county of Hudson and State of New Jersey, have invented a new and useful Improvement in a Velocipede, of which the following is a specification.

My invention relates to that class of velocipedes which are fashioned to resemble a horse or other running animal, mounted upon a cycle frame, and the objects of my improvement are—first: to provide a means for propelling the vehicle by rocking the body of the animal backward and forward while the rider is mounted on its back, and secondly: to furnish a device for so steering the vehicle that it shall closely resemble the manner in which a horse is guided by the reins in the hands of its rider.

In many of the velocipedes made in the form of a running animal and now in use the vehicle is propelled by the means of levers or pedals, which are operated or driven by the hands or feet of the rider. In my invention the rider is mounted on the velocipede in the natural and ordinary manner which is assumed by a man on horseback. He propels the vehicle by the forward and backward movement of the animal's body and without the direct use of either hands or feet, and he steers the same by the use of reins, bridle and bit in a way which resembles that of a horseman on a living animal.

I attain the above mentioned objects by the mechanism illustrated in the accompanying drawings, in which Figure "1" is a side elevation of my entire invention: Fig. "2" is a vertical side view of my invention as it appears after the removal of the body of the animal and the wheels: Fig. "3" is a top view of the same, partly broken and partly in section, the said body and the upper portion of the steering device having been removed: Fig. "4" is a vertical rear view in section of a part of my invention; and Fig. "5" is a detailed plan view of the upper portion of the steering device.

Similar letters refer to similar parts throughout the several views.

The body 1 is made in the form of a running animal such as a horse. It is provided with the bearer 11 which is securely attached to it by the transverse rod 15 and it is mounted on the main frame 2 of the velocipede. The bearer 11 is adapted to oscillate on the head 9 of the main frame 2 and is provided with a fixed pivot 12 operating between the lugs 10 of the pivot head 9 and secured thereto by the bolt 13. The upper face of the pivot head is beveled at 14.

The main frame 2 is preferably rectangular in shape, the rectangle being formed by the front crank shaft 6, the rear crank shaft 7 parallel therewith, and by the longitudinal connecting bars 4 and 5. From the corners of the rectangle thus formed divergent braces 8 extend upwardly converging in the pivot head 9 of the main frame, and connecting said corners with said pivot head. The said crank shafts are preferably triple in form, being each provided with three cranks of ordinary shape and design.

The bearer 11 is made to oscillate by rocking the body 1 back and forth and its motion is transmitted to the crank shafts 6 and 7 by the pitmen 19 and 18 respectively, which are pivotally connected at the upper ends thereof to the branched extremities 17 and 16 respectively of the bearer 11. The pitmen are connected at their lower ends with and journaled on the cranks 26 and 24 respectively of said crank shafts; said crank shafts are journaled on the main frame 2 at its corners; and the rear crank shaft 7 is provided at its extremities with a pair of driving wheels 25 which it is adapted to operate. When the body 1 is rocked backward and forward these driving wheels will be made to rotate and the vehicle which is the subject of my invention will be propelled.

In order that the revolution of the crank shafts 6 and 7 may be uniform and a dead center thereof be avoided the controlling bar 20 is provided. This bar connects the cranks 6 and 7 and regulates their motion. It is preferably branched at each extremity, the front branches 22 connecting with the two cranks 27, and the rear branches 21 connecting with the two cranks 23, and the said branches are journaled on the corresponding cranks. These branches may be dispensed with and each end of the controlling bar may be journaled on a single crank in each crank shaft without avoiding the principle of my invention.

The longitudinal bars 4 and 5 are extended outwardly and upwardly beyond the front end of the main frame 2, converging and terminating in the steering socket 28 and forming therewith an inverted V shaped reach which connects the steering device 3 with the said main frame of the velocipede. This steering device is provided with a steering post 31 upwardly inclined and operating in the steering socket 28; a steering fork 29, a steering wheel 30 journaled to the branches of said steering fork, and a steering lever 33 which is rigidly mounted upon the upper extremity of the steering post 31, and held firmly thereon by the nut 32. The steering lever 33 is adapted to swing in a nearly horizontal plane and operates the steering fork 29 to which it is connected by the steering post 31.

To each side of the head portion of the body 1 a bit 35 is pivotally mounted at its upper extremity. These two bits are joined by the bolt 34 passing through the head portion of the horse. Each bit operates independently of the other, and is connected to and moved by the reins 40. The motion of the bits 35 is transmitted to the steering lever 33 by the two steering rods 37. Each steering rod is pivotally connected at its front end to its corresponding bit at the lower extremity 36 of the latter. At its rear end it is attached to the respective extremities of the steering lever 33. In order to provide for play in the lateral movement of the steering lever 33 a slot 38 is cut in the rear end of each steering rod 37, and the extremities of the steering lever are adapted to slide in said slots in a nearly horizontal plane, and are kept in place by the nuts 39.

Instead of the form of a running animal the body of any creature or an oscillating chair or seat may be incorporated into the propelling mechanism of my invention, and also such propelling mechanism may be employed in a velocipede independently of the steering device hereinbefore described without altering or avoiding the principle and spirit of my invention.

I am aware that prior to my invention velocipedes have been made with the bodies of animals mounted on cycle frames. I therefore do not claim such a combination broadly but What I do claim as my invention, and desire to secure by Letters Patent, is:—

1. In the frame of a velocipede the combination of the front crank shaft 6, the rear crank shaft 7 parallel therewith, the longitudinal connecting bars 4 and 5, the divergent braces 8 extending upwardly therefrom and converging in the pivot head 9, the lugs 10 of said pivot head, and the bolt 13 operating in them, substantially as described.

2. In a velocipede the combination of the body of a running animal pivotally mounted on a cycle frame and adapted to rock back and forth thereon, a bearer supporting the same and pivotally connected at its extremities with pitmen; front and rear crank shafts on whose cranks the opposite ends of the pitmen are journaled, a rear crank shaft adapted to rotate driving wheels; the controlling bar connecting the crank shafts and adapted to produce a uniform revolution thereof, the steering post operating in a socket and connecting a steering fork and steering wheel to a steering lever moving in a nearly horizontal plane, steering rods with slotted rear extremities adapted to move the steering lever and to slide upon its extremities, the bits oscillating on the head portion of the body and pivotally connected to the steering rods and the reins controlling the bits, substantially as described.

3. In a velocipede a steering device comprising a steering fork, a steering wheel journaled to its branches, an inclined steering post on said fork and extending upwardly, a steering lever 33 rigidly mounted on the upper extremity of said steering post, the head portion of the body 1, the bits 35 pivotally mounted thereon and adapted to move independently of each other, the bolt 34 passing through and joining said bits, the reins 40 controlling said bits, the steering rods 37 moving said steering lever and operated by said bits, each rod being pivotally connected at its front extremity to the corresponding bit and provided at its rear extremity with slots cut longitudinally therein wherein the respective ends of the steering lever are adapted to play, substantially as described.

In testimony whereof I have signed my name to this specification in the presence of two subscribing witnesses.

ORSON A. MORSE.

Witnesses:
JOHN M. NOLAN,
EMILY BAXTER.